United States Patent
Muttik et al.

(10) Patent No.: US 9,881,072 B2
(45) Date of Patent: Jan. 30, 2018

(54) DYNAMIC FEATURE SET MANAGEMENT

(71) Applicant: McAfee, LLC., Plano, TX (US)

(72) Inventors: Igor Muttik, Berkhamsted (GB); Paul H. Whittington, Idaho Falls, ID (US)

(73) Assignee: McAfee, LLC., Plano, TX (US)

( * ) Notice: Subject to any disclaimer, the term of this patent is extended or adjusted under 35 U.S.C. 154(b) by 309 days.

(21) Appl. No.: 14/459,933

(22) Filed: Aug. 14, 2014

(65) Prior Publication Data

US 2016/0048573 A1 Feb. 18, 2016

(51) Int. Cl.
G06F 17/00 (2006.01)
G06F 17/30 (2006.01)
H04W 4/00 (2009.01)

(52) U.S. Cl.
CPC .. G06F 17/30598 (2013.01); G06F 17/30345 (2013.01); H04W 4/005 (2013.01)

(58) Field of Classification Search
CPC ........ G06F 17/30345; G06F 17/30569; G06F 17/30598; G06F 19/3418; G06F 21/56
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,233,575 B1 * | 5/2001 | Agrawal | G06F 17/3071 |
| 6,460,050 B1 | 10/2002 | Pace et al. | |
| 7,506,155 B1 | 3/2009 | Stewart et al. | |
| 7,692,573 B1 | 6/2010 | Funk | |
| 2003/0018467 A1 | 1/2003 | Sekiguchi | |
| 2007/0226247 A1 | 9/2007 | Ferm et al. | |
| 2007/0289207 A1 * | 12/2007 | May | A01G 7/00 47/17 |
| 2009/0066505 A1 | 3/2009 | Jensen et al. | |
| 2014/0281684 A1 * | 9/2014 | Beckman | G06F 17/30303 714/6.11 |

FOREIGN PATENT DOCUMENTS

| | | |
|---|---|---|
| EP | 2503668 A1 | 9/2012 |
| WO | 2016025088 A1 | 2/2016 |

OTHER PUBLICATIONS

International Search Report and Written Opinion in International Application No. PCT/US2015/037692 dated Sep. 22, 2015.
International Preliminary Report on Patentability issued in PCT Application No. PCT/US2015/037692 dated Feb. 14, 2017; 8 pages.

* cited by examiner

*Primary Examiner* — Truong Vo
(74) *Attorney, Agent, or Firm* — Patent Capital Group

(57) ABSTRACT

In an example, a network is described with a plurality of data sources. Each data source may provide a feature, such as a data type that the data source collects or generates. A data aggregator may be connected to the network, and configured to collect, classify, and merge features as appropriate. The data aggregator includes a discriminator for classifying features, a merger, unmerger, converter, and evaluator. Features are provided to one or more expert systems configured to control one or more systems based on the features. Feedback to the data aggregator is used to evaluate the success of a merge. When a merge is found to be unhelpful, features may be unmerged.

25 Claims, 6 Drawing Sheets

DYNAMIC FEATURE SET MANAGEMENT

FIELD OF THE DISCLOSURE

This application relates to the field of data automation, and more particularly to a system and method for dynamic feature set management.

BACKGROUND

In certain known or historical systems, data collection consists of purposefully placing a number of bespoke sensors at known locations, and configuring a control system to collect data from the sensors. These may be used as inputs, for example, to an open-loop or closed-loop control system. A well-known example includes a thermostat placed in an air-conditioned room. The thermostat measures the temperature in the room, and turns the air conditioner on or off to compensate for the current temperature.

The use of bespoke sensors requires, in certain examples, the development and deployment of customized software. As the number of sensors increases, so too may the complexity of the software.

BRIEF DESCRIPTION OF THE DRAWINGS

The present disclosure is best understood from the following detailed description when read with the accompanying FIGURES. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Example Embodiments of the Disclosure

Figure 1:
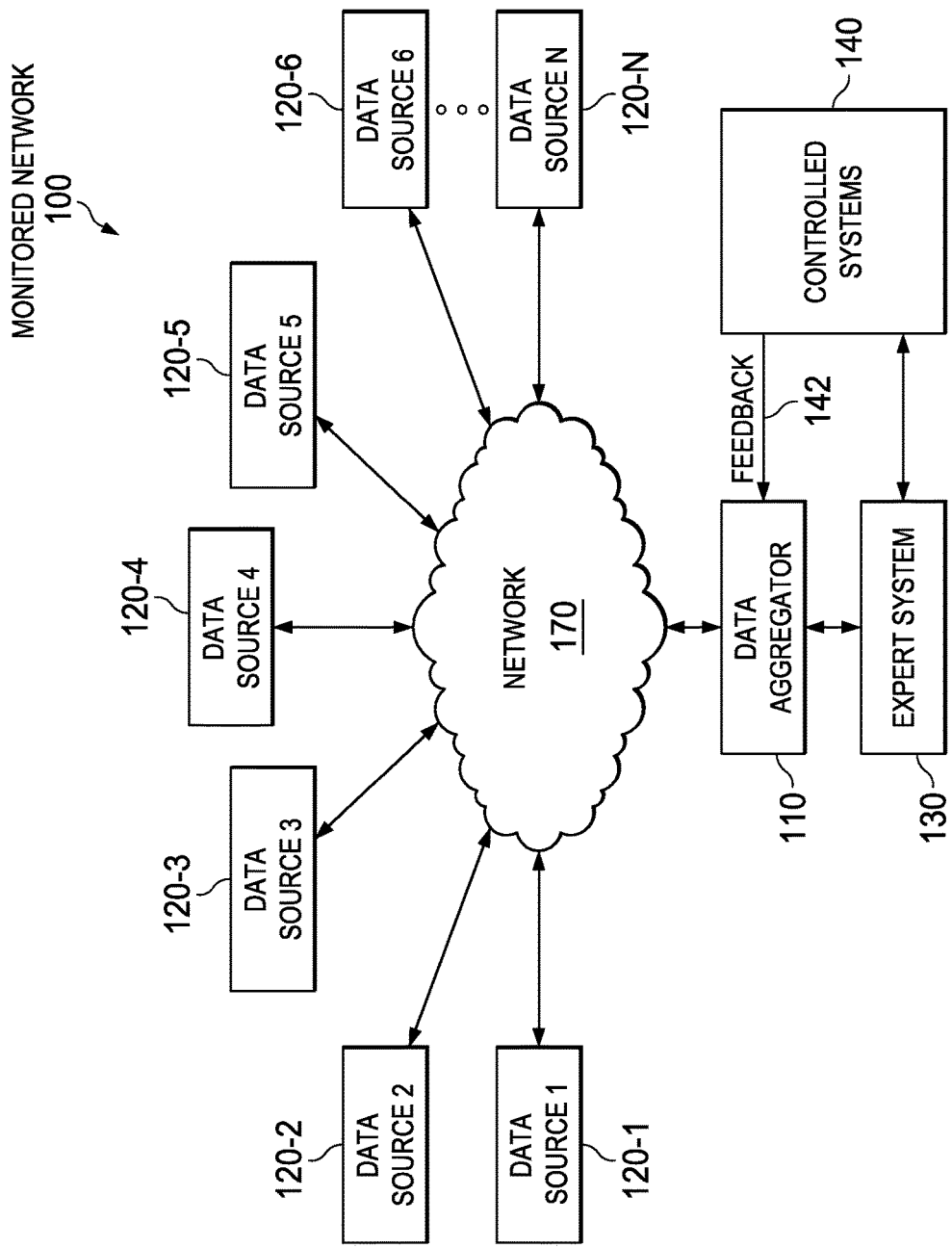
FIG. 1 is a network diagram of a monitored network according to one or more examples of the present Specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments may have different advantages, and no particular advantage is necessarily required of any embodiment.

The growth of the Internet of things (IoT) is resulting in millions and even billions of devices coming online. These devices may generate a great wealth of data of different types. Because the number and type of devices is constantly growing, and because the volume and variety of data are both becoming large and unwieldy, data artifacts associated with the operation of these various devices may be encountered. Coping with such an environment may require acquisition and semantic mapping of different types of data artifacts, and situational analysis and response generation based on the mapped data.

An illustrative example is security in the IoT context. One security-related activity is the real-time detection of anomalies, and associated hardware and/or software faults and attacks, which may be accomplished by using advanced numerical analysis and the big-data IoT environment. To detect new types of attacks and anomalies, and to be effective against focused attacks (characterized by a short time span and very few targets), the system may need to be able to rapidly consume new inputs, referred to herein as "features."

The large number and wide variety of features makes it increasingly impractical to manually configure all features and outputs, and to manually merge like data types. Going forward, new features may need to be automatically evaluated, semantically mapped, and intelligently applied. Useful features, including overlapping features, may need to be merged, while ineffective or erroneous features may need to unmerged or discarded.

In certain known systems, a solution to the issue of multiple features may take the form of a security information and event management system (SIEM), which standardizes and normalizes features with per-data-source static semantic mappers implemented in a data acquisition layer component of the system. It is recognized in this Specification, however, that in certain embodiments, this approach may suffer some disadvantages, such as being expensive and slow. In some cases, a SIEM may require correlated changes to multiple products. Furthermore, as data representation standards change, retroactive modifications to legacy products are often required. This may also lead to an expanding set of features and increased computational costs (each feature is usually an extra dimension in machine learning algorithms, potentially leading to significant increases in required computational resources). Effective management of a fluid feature set, such as semantic mapping, creating, merging, communicating, storing, and deleting, may be a significant challenge in Internet-scale data management.

According to an example system and method of the present Specification, there is provided the ability to provide useful features such as:

automatic evaluation of new features;
  merging of identical, related, or overlapping features, such as through semantic mapping;
  evaluation of system efficiency for merged features compared to unmerged features; and
  unmerging of incorrectly-merged features.

To this end, a network is provided, such as the Internet or a local network. A plurality of data sources are connected to the network, and may include such disparate devices as sensors, computers, transducers, data aggregators, and other similar types of devices. Even among a single class of devices, a great variety of outputs may be provided. For example, in the class of sensors, there may be temperature sensors, humidity sensors, pollution sensors, moisture sensors, motion sensors, audio sensors, electromagnetic interference sensors, infrared sensors, and vibration sensors merely by way of non-limiting example.

Each of the plurality of data sources may come from a different vendor, and may provide an output in a different format. Each data source may also connect to the network by a different type of connection, and may have a different purpose. Thus, as the number of data sources multiplies, it becomes increasingly difficult to aggregate the data sources and provide useful profiles of real world phenomena, while enabling a user or system to take appropriate action responsive to those real-world phenomena.

To take just one example, consider the case of a server farm. The server farm itself may host many different types of servers, such as rackmount servers, blade servers, stand-alone servers, dedicated storage devices, and each having one of several operating systems such as Microsoft Windows, enterprise UNIX, Linux, or real-time operating systems, by way of non-limiting example.

Each server may generate a plurality of outputs that are available to the network as features. For example, each server may have internal sensors measuring hard disk speed, CPU temperature, antivirus status, disk usage, memory usage, peripherals connected, and uptime by way of non-limiting example.

In addition to the outputs provided by the servers themselves, a number of other devices may be operative within the server farm. For example, a number of security cameras may be provided, with motion sensitive image capture algorithms that are operative to detect when a person or object is moving within the server farm room, and to capture an image. The camera may then provide an alert along with the image, indicating that there is potentially an unauthorized person in the server farm. Other important factors may be HVAC (heating, ventilation and air conditioning) status, ambient temperature, outside temperature, power status and fluctuations, environmental conditions such as radiation and pollution, status of intrusion detection alarms, status of other environmental sensors such as radiation sensors, pollution sensors, humidity sensors, ozone detectors, and smoke detectors by way of non-limiting example. There may also be network health indicators, data about a plurality of users operating and accessing the servers, data about status of peripherals, and other metrics of various usefulness.

Handling, aggregating, and usefully applying such a large and diverse collection of data in just one environment may become prohibitively difficult for a human operator to manage. Thus, it is advantageous to have available an automated aggregation and expert system to intelligently collect and aggregate inputs, and intelligently apply them to active systems.

In one example, there is connected to the network a data aggregator, which may include by way of non-limiting example a discriminator, a merger, an unmerger, a converter, and evaluator. The data aggregator may be configured to receive a large number of features, including in some embodiments metadata describing each feature. In some cases, the metadata may be provided in a standards-compliant format such as extensible markup language (XML). For example, an XML feature description may be as follows:

```
"featurename=feature1", "id=1", "previousid=NUL",
type=unsigned32", "sourceproductgroup=SIEM",
"sourceversion=9.3", "min=0", "max=10000",
"keywords=SIEM, feature1", "attribute1=NUL",
"featurecreated=2014-01-01T13:10:02.47",
"lastmerged=2014-01-15T15:15:05.06"
```

In an example of another feature, the description may be:

```
"featurename=detectionname", "id=2", "previousid=NUL",
"type=string", "sourceproductgroup=virusscan",
"sourceversion=8.8",
"keywords=malware,virus,detection,name",
"featurecreated=2014-01-01T13:10:02.05",
"lastmerged=2014-01-15T15:15:05.06"
```

The data aggregator may be operable to intelligently scan the metadata and make educated decisions about which features should be consolidated, and which should be provided to certain control systems for feedback purposes. For example, it may be evident to a human user that the two features described above are dissimilar and should not be merged.

A heating, ventilation, and air conditioning (HVAC) system for a server farm may be usefully considered by way of illustration and example, though it will be readily apparent that the system and method disclosed in this Specification are broadly applicable to a wide range of systems. The example HVAC may benefit from a plurality of temperature sensors placed throughout the server farm.

However, other temperature inputs may be available from other devices, and may provide more accurate feedback for the HVAC controller if they can be usefully correlated to or aggregated with the data from the HVAC's bespoke temperature sensors. Thus, a data aggregator may be provided to aggregate combinable features. The combinable features may not always be in a compatible format, however. For example, the HVAC's bespoke temperature sensors may use an XML field of "featurename=temp_hvac" to identify the temperature feature, while an independent temperature sensor may use an XML field such as "output_type=temperature." It may be evident to a human user that these features are good candidates for merger.

An aggregator of the present Specification may be configured to recognize that "featurename" and "output_type" both identify the feature in question, and that "temp_hvac" and "temperature" both identify a temperature measurement. The aggregator may also draw other useful conclusions. For example, a temperature sensor in Italy may have little or no useful data for an HVAC operating in a San Jose, Calif.-based server farm. Indeed, aggregating the Italy data with the San Jose data may result in decreased operational efficiency.

Thus, the aggregator may be configured with levels of intelligence for handling such situations. In the first place, the aggregator may infer a location from other metadata, such as finding a "sensor_location" field if available, or determining that an IP address for the sensor is likely to place it in or near the server farm. The aggregator may also receive feedback to determine the effectiveness of the merge. For example, after inadvertently merging the Italy data with the San Jose data, the HVAC may begin working harder to change the temperature in the San Jose server farm with unsatisfactory effect on the aggregate data set. The San Jose sensors may also show a strong tracking with one another, while the Italy sensor may be highly insensitive to the operation of the San Jose HVAC. Thus, the aggregator may determine that the merger with the Italy sensor was not helpful, and may unmerge the data sets.

In another example, the data aggregator may determine that CPU temperature sensors should be aggregated with the HVAC sensors. This may cause the HVAC controller to believe that there is a large temperature transient in the server room, because the CPU temperature will typically be much higher than the ambient temperature. Thus, the HVAC may drastically alter its cooling output to try to compensate for the mistaken temperature transient. The CPU temperature sensors may respond somewhat to this increased output, as they are in the server farm, but the response may be relatively inelastic, providing unsatisfactory response in the aggregated feature compared to the energy expended for the result. Thus, the feature may be unmerged, increasing the efficiency of the HVAC.

FIG. 1 is a network level diagram of a monitored network 100 according to one or more examples of the present Specification. Monitored network 100 includes a plurality of data sources 120 connected to a network 170. Also connected to network 170 is a data aggregator 110, communicatively coupled to an expert system 130, controlling controlled systems 140. Controlled systems 140 provide feedback 142 to data aggregator 110.

In one or more examples, data sources 120-1 through 120-N are disclosed. This is to illustrate that the number of data sources 120 may be large, and may be in constant fluctuation as new data sources 120 are added to and removed from monitored network 100. As described above, management of data sources 120 may be complicated both by the large number of data sources 120, and by the dynamic nature of monitored network 100. Thus in certain embodiments, it may be impractical for a human administrator to monitor and administer all of the various data sources 120. Furthermore, data sources 120 may not be statically located on network 170. For example, many cars carry data collection devices, and may provide data to network 170 as they hop from node to node on a mobile network. Thus, it may not be practical to predict in advance from which direction data will be coming, or what the nature of the data may be.

By way of further complication, a plurality of data sources 120 may provide data features of similar or identical types, but in slightly different formats. In one example, each data source 120 is configured to provide a data stream accompanied by a metadata packet identifying the type and source of data. However, there may be no globally enforced or enforceable standard for such metadata packets. In one example, data sources 120 may at least standardize on a delivery format for the metadata, such as XML or a similar standards-compliant data format. In that case, the metadata may have a number of identifiable field names, from which the feature type and source may be inferred. It should also be noted that in some cases data sources 120 may provide features of a compatible type, but in different formats. An example of this is a temperature feature provided by one data source 120-1 in Fahrenheit, and a second feature provided by a second data source 120-2 in Celsius. Similar issues may be encountered in any case where two or more data sources deliver similar features, with one data source providing the feature in metric units and the other data source providing the feature in Imperial or U.S. Customary units.

This large collection of features of disparate types from different sources, and in different formats, is delivered via network 170 to a data aggregator 110. Data aggregator 110 collects the many features, and attempts to classify the features according to a useful taxonomy. In one case, data aggregator 110 defines a taxonomy having an arbitrary number of classification levels, such as classes, sub-classes, genera, and species. For example, the class of environmental data may include the subclass of temperature, which may include further species of temperatures by location or source. In one example, all environmental features are classified as environmental features, temperature features are classified as temperature features, and temperature features of a common species may be aggregated by data aggregator 110 as being species that may be usefully combined. Data aggregator 110 may then provide one or more outputs to expert system 130.

Expert system 130 may include one or more devices operable to collect features and to control one or more controlled systems 140. Expert system 130 may make decisions based on lookup tables, computer models, algorithms, or machine learning techniques. Features provided by data aggregator 110 may provide key inputs into the decisions that expert system 130 must make.

Controlled systems 140 may include a number of real-world systems, such as air-conditioning, environmental systems, security systems, traffic systems, space-based systems, and any other system subject to automated control or data-driven operation. Controlled system 140 may include in certain embodiments facilities to measure the response of controlled systems 140 to inputs from expert system 130. Controlled systems 140 may then provide feedback 142 to data aggregator 110. This may allow data aggregator 110 to measure the effect of combining or cross correlating certain features. In cases where data aggregator 110 determines that combining or cross correlating certain features has minimal impact on controlled systems 140, or in some cases even negative impact on controlled systems 140, data aggregator 110 may elect to unmerge certain features that are not found to be usefully combined.

Figure 2A:
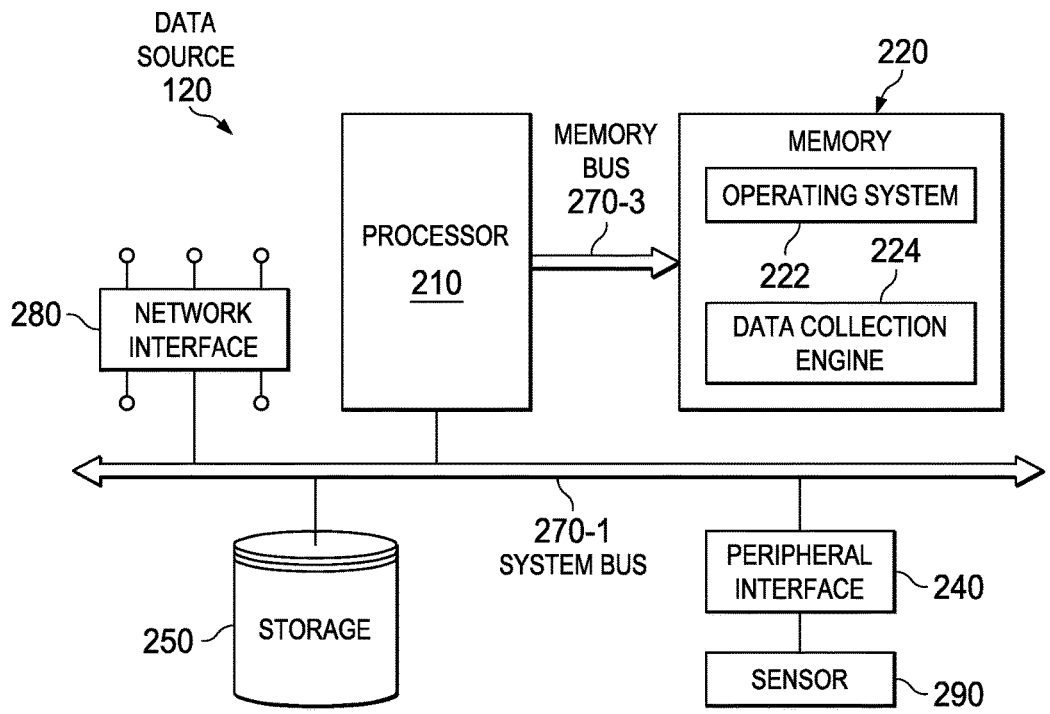
FIG. 2A is a block diagram of a data source according to one or more examples of the present Specification.

FIG. 2A is a block diagram of a data source 120 according to one or more examples of the present Specification. In various embodiments, a "data source" may be or comprise, by way of non-limiting example, a sensor, detector, peripheral, monitoring device, transducer, intelligent control system, monitoring system, satellite or space-based system, computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or micro-electromechanical device for processing and communicating data. A defining characteristic of a data source according to this Specification is that it provides one or more features according to the system and method of the present Specification.

Data source 120 includes a processor 210 connected to a memory 220, having stored therein executable instructions for providing an operating system 222 and data collection engine 224. Other components of data source 120 include a storage 250, network interface 280, and peripheral interface 240.

In an example, processor 210 is communicatively coupled to memory 220 via memory bus 270-3, which may be for example a direct memory access (DMA) bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 210 may be connected to memory 220 in a DMA configuration via Memory bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device, such as a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as an operating system and a copy of operating system 222 and software portions of data collection engine 224. Many other configurations are also possible, and are intended to be encompassed within the broad scope of this Specification.

Network interface 280 may be provided to communicatively couple data source 120 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, local data bus, or any other appropriate architecture or system that facilitates communications in a network or telephonic environment.

Data collection engine 224, in one example, is a utility or program that carries out methods according to this Specification. Data collection engine 224 may be, in various embodiments, embodied in hardware, software, firmware, or some combination thereof. For example, in some cases, Data collection engine 224 may include a special integrated circuit designed to carry out a method, and may also include software instructions operable to instruct a processor to perform the method. The software may be provided as a "daemon" program, including any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. It should also be noted that data collection engine 224 is provided by way of non-limiting example only, and that other hardware and software, including interactive or user-mode software, may also be provided in conjunction with, in addition to, or instead of data collection engine 224 to perform methods according to this Specification.

Figure 8:
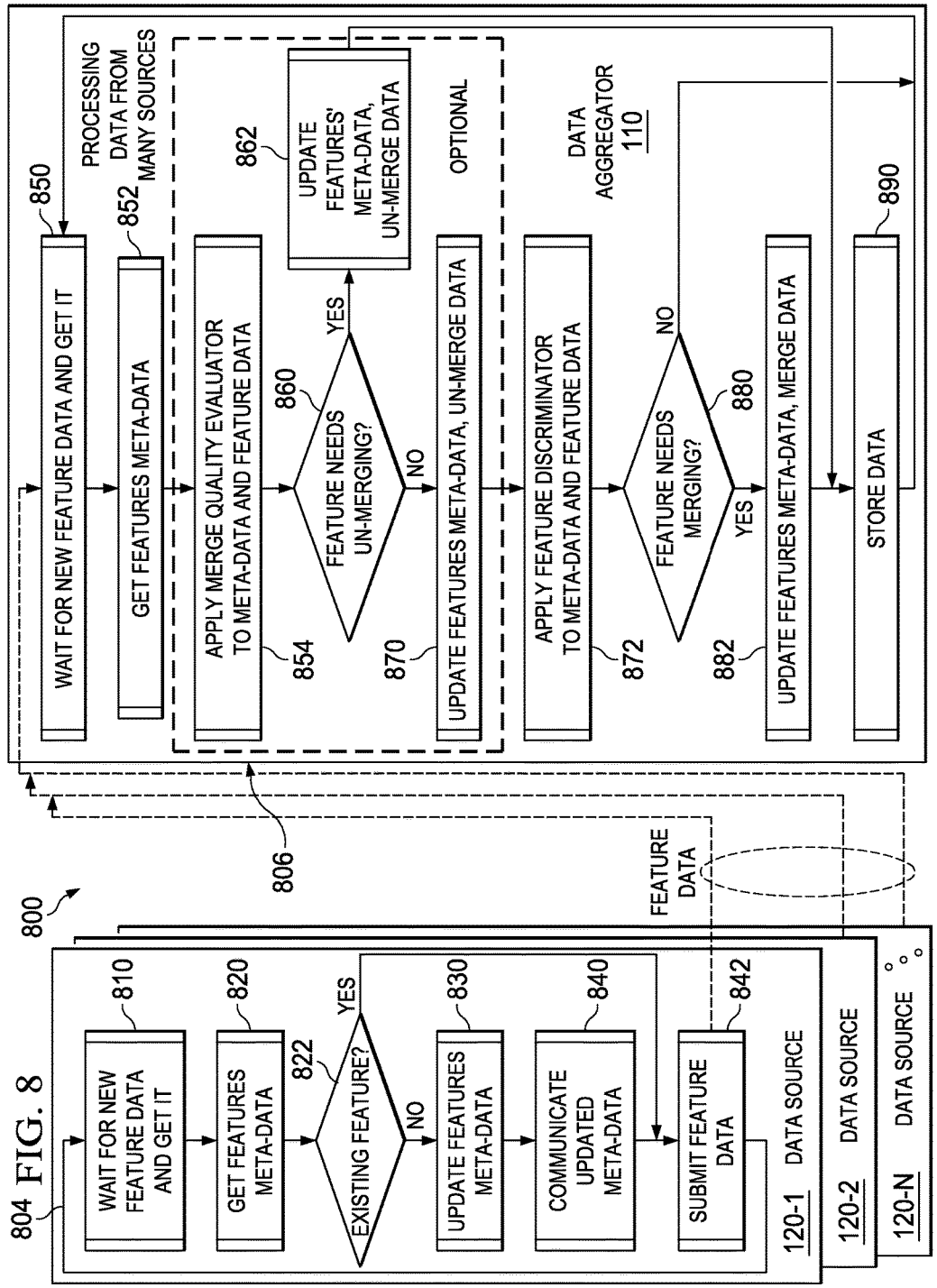
FIG. 8 is a flow diagram of a method according to one or more examples of the present Specification.

In one example, data collection engine 224 includes executable instructions stored on a non-transitory medium operable to perform method 800 of FIG. 8, or software portions thereof, or a similar method according to this Specification. At an appropriate time, such as upon booting data source 120 or upon a command from the operating system or a user, processor 210 may retrieve a copy of data collection engine 224 (or software portions thereof) from storage 250 and load it into memory 220. Processor 210 may then iteratively execute the instructions of data collection engine 224.

Peripheral interface 240 includes any auxiliary device that connects to data source 120 but that is not necessarily a part of the core architecture of data source 120. A peripheral may be operable to provide extended functionality to data source 120, and may or may not be wholly dependent on data source 120. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example. In an example, peripherals include one or more sensors 290, which may be configured and operable to collect data about real-world phenomena and to process the data into a digital form.

In one operative example, data collection engine 224 collects data from sensor 290 via peripheral interface 240. The collected data may then be stored in storage 250 and/or sent over network interface 280.

Figure 2B:
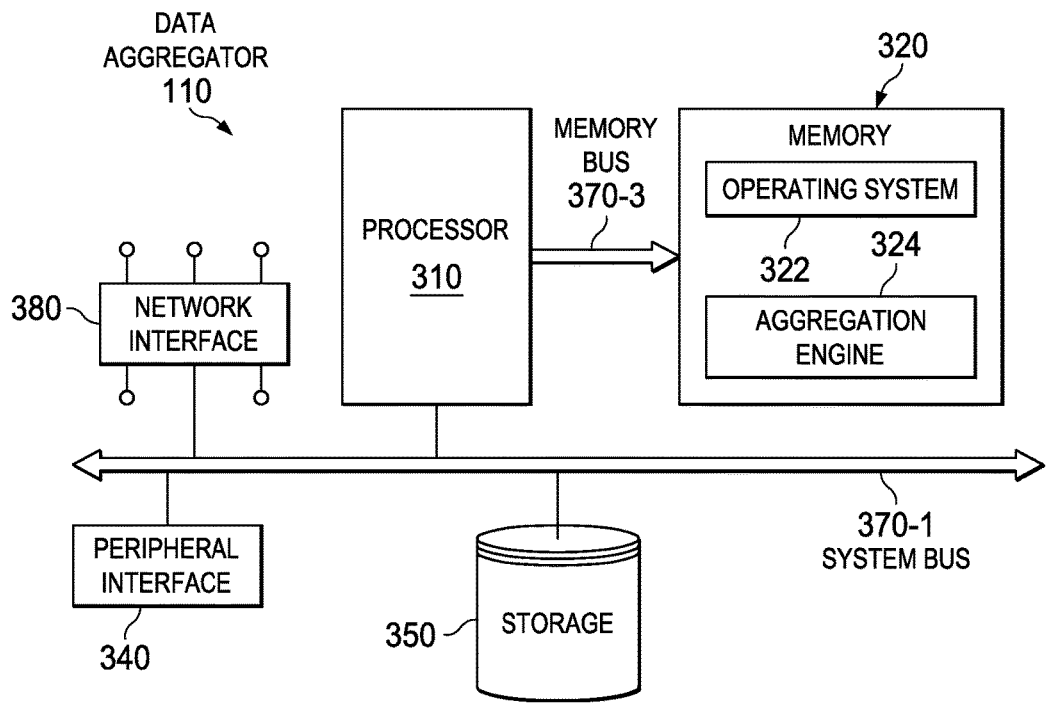
FIG. 2B is a block diagram of a data aggregator according to one or more examples of the present Specification.

FIG. 2B is a block diagram of a data aggregator 110 according to one or more examples of the present Specification. In an example, data aggregator 110 is a computing device. As used throughout this Specification, a "computing device" may be or comprise, by way of non-limiting example, a computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or microelectromechanical device for processing and communicating data. Reference is also made to the associated description for FIG. 2A, in which the examples and definitions may also be applied to FIG. 2B to the extent they are relevant.

Data aggregator 110 includes a processor 310 connected to a memory 320, having stored therein executable instructions for providing an operating system 322 and aggregation engine 324. Other components of data aggregator 110 include a storage 350, network interface 380, and peripheral interface 340.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via memory bus 370-3. To simplify this disclosure, memory 320 is disclosed as a single logical block, but in a physical embodiment may include one or more blocks of any suitable volatile or non-volatile memory technology or technologies.

Storage 350 may be any species of memory 320, or may be a separate device. Storage 350 may be, or may include therein, a database or databases or data stored in other configurations, and may include a stored copy of operational software such as an operating system and a copy of operating system 322 and software portions of aggregation engine 324. Many other configurations are also possible, and are intended to be encompassed within the broad scope of this Specification.

Network interface 380 may be provided to communicatively couple data aggregator 110 to a wired or wireless network.

Aggregation engine 324, in one example, is a utility or program that carries out methods according to this Specification. Aggregation engine 324 may be, in various embodiments, hardware, software, firmware, or some combination thereof. For example, in some cases, aggregation engine 324 may include a special integrated circuit designed to carry out a method, and may also include software instructions operable to instruct a processor to perform the method. It should also be noted that aggregation engine 324 is provided by way of non-limiting example only, and that other hardware and software, including interactive or user-mode software, may also be provided in conjunction with, in addition to, or instead of aggregation engine 324 to perform methods according to this Specification.

In one example, aggregation engine 324 includes executable instructions stored on a non-transitory medium operable to perform method 800 of FIG. 8, or software portions thereof, or a similar method according to this Specification. At an appropriate time, such as upon booting data aggregator 110 or upon a command from the operating system or a user, processor 310 may retrieve a copy of aggregation engine 324 (or software portions thereof) from storage 350 and load it into memory 320. Processor 310 may then iteratively execute the instructions of aggregation engine 324.

Figure 3:
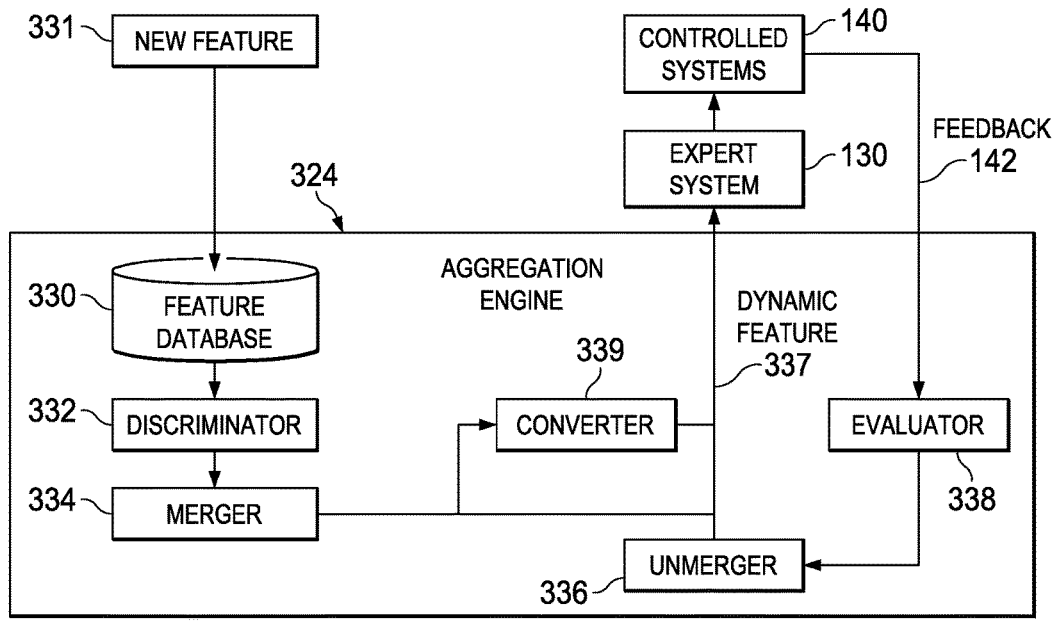
FIG. 3 is a block diagram of an aggregation engine according to one or more examples of the present Specification.

FIG. 3 is a block diagram of aggregation engine 324 according to one or more examples of the present Specification. It should be noted that aggregation engine 324, as described above, may include any combination of hardware, software, firmware, or other control systems operable to provide the functions of aggregation engine 324. Thus it is intended in the Specification that the term "aggregation engine" encompass any combination of hardware, software, firmware, or other structure configured and operable to carry out the methods of aggregation engine 324 as disclosed herein.

In some cases, aggregation engine 324 may be a discrete and separate unit, such as a system-on-a-chip, single board computer, application-specific integrated circuit, standalone computing device, or similar. In other cases, the functions of aggregation engine 324 may be distributed throughout a computing device or a network. Thus, for example, certain data may be provided by a database server, while certain intelligence may be provided by one or more processors operating in tandem. Thus it should be understood that aggregation engine 324 need not necessarily be a single unit separable from other components of monitored network 100. Those with skill in the art will recognize that many other configurations are possible.

FIG. 3 discloses by way of example a new feature 331 provided to aggregation engine 324. It should be noted that this is disclosed by way of example only, and in some cases, a plurality of new features 331 may be provided to aggregation engine 324 as a unit, or separately.

In this example, new feature 331 is provided to feature database 330. Feature database 330 is communicatively coupled to a discriminator 332, which is communicatively coupled to a merger 334. Merger 334 may be communicatively coupled to a converter 339 and to expert system 130. Converter 339 may also be communicatively coupled to expert system 130. Expert system 130 controls controlled systems 140, which provide feedback to evaluator 338. Evaluator 338 provides unmerger 336, which is also communicatively coupled to expert system 130 to provide unmerge features. It should be noted that this arrangement is provided by way of example only for purposes of illustration and that actual signal paths and operational details may be significantly different from the arrangement disclosed in FIG. 3.

In an example, discriminator 332 is operable to receive one or more features from feature database 330. The features from feature database 330 may include new feature 331. Discriminator 332 may then classify new feature 331 according to the taxonomy and methods disclosed herein. For example, discriminator 332 may determine that two features that are labeled differently (such as having a different value in a "featurename" field, or different values, one in a "featurename" field and one in a "name" field) are candidates for merger. The effectiveness of dynamic feature management is evidently dependent on the quality of discrimination provided by discriminator 332. To assist discriminator 332 in making correct decisions, static meta-data descriptions of features may be provided. For example:

Attributes in meta-language (e.g., types, labels, names, descriptions, tags, and keywords) for the feature. Any combination may provide useful hints of feature semantic relatedness and/or clues for applicable analysis activities. For example "user name" in one feature may be "username" in another feature, "login name" in a third feature, and "account" in yet a fourth feature.

Direct analysis of content. For example, direct matches in different login logs, with one identifying "username=johndoe" and another with "account=johndoe" would hint that "username"=="account," and that this is a possible feature overlap.

A feature thesaurus. Using a thesaurus for features may provide "fuzzy" matching, potentially with an accompanying confidence level. For example, the thesaurus may indicate "username"="account" with 98% confidence. Associations may be driven by external sources, such as a cloud security service or Internet crowd sourcing. The thesaurus may help group features based on semantic similarity in the features' meta-language descriptions.

Suitability or applicability of a feature in an algorithm used by expert system 130.

Merger 334 receives from discriminator 332 the two or more features that have been identified as merger candidates. Merger 334 may then make a determination about whether new feature 331 may be usefully merged with the other existing feature. If merger 334 determines that new feature 331 may be usefully combined with other features, then merger 334 may form a new dynamic feature 337.

If merger 334 determines that new feature 331 is compatible with the existing feature, but that they are in different formats, such as using different units, merger 334 may provide the features to converter 339. Converter 339 may convert new feature 331 into a format such that it may be merged with the existing feature. Aggregation engine 324 then provides the converted and merged feature as dynamic feature 337.

In an example, merger 334 retains sufficient information about the merge process to roll back the merge later if necessary.

As described in this Specification, expert system 130 may then issue controls based on dynamic feature 337. In the example of an air-conditioning system, expert system 130 may determine that once the value of dynamic feature 337 drops below a certain temperature, the air-conditioners should be turned on, or the power of the air-conditioners should be increased. Expert system 130 then issues control signals to controlled systems 140 (in this case an HVAC) to try to achieve a desired real-world phenomenon (in this case, regulating the temperature to a desired value). It should be noted that expert system 130 need not be a centralized or single expert system. In some cases, each controlled system 140 may have its own expert system 130, such as an internal controller. Thus, it is not intended that this Specification be limited to an application where a single, monolithic, centralized expert system 130 is provided, though such a system is anticipated as one example.

As controlled systems 140 carries out the instructions of expert system 130, it may experience measurable changes in effect and efficiency. For example, if dynamic feature 337 proves to be a useful merge, then controlled systems 140 may operate more effectively or efficiently with dynamic feature 337 as an input than it did with a previous lone static feature as an input. However, if dynamic feature 337 provides little or no change in efficiency or effectiveness, or even has a negative impact, it may be desirable to unmerge the features.

Evaluator 338 evaluates the effectiveness of controlled systems 140 in light of dynamic feature 337. Because merger 334 is not expected to be perfect, it will sometimes commit error in its merge decisions. If evaluator 338 determines that dynamic feature 337 is useless, nearly useless, or harmful, it may provide dynamic feature 337 to unmerger 336. One method of identifying such errors is to employ machine learning, which may operate in either a supervised or unsupervised mode. Evaluator 338 may also be operable to confirm that anomaly detection based on merged features has the same quality, within a tolerance, as the merged features.

Unmerger 336 is operable and configured to unmerge new feature 331 from dynamic feature 337. Unmerger 336 may then provide the unmerged features to expert system 130.

Figure 4:
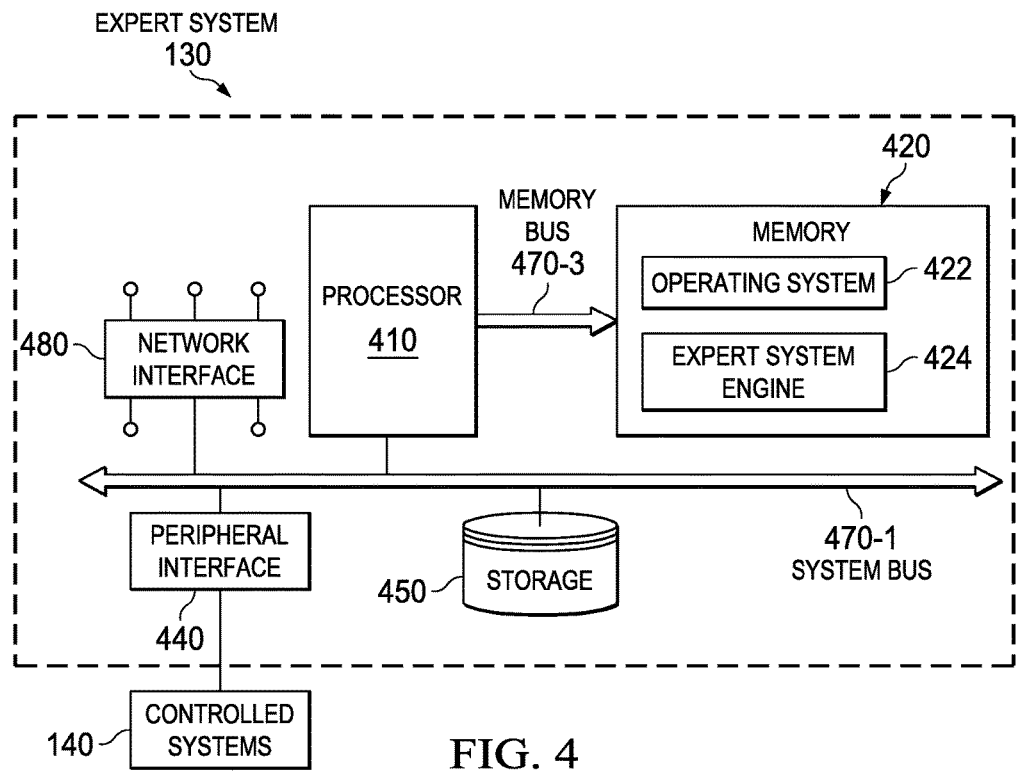
FIG. 4 is a block diagram of an expert system according to one or more examples of the present Specification.

FIG. 4 is a block diagram of expert system 130 according to one or more examples of the present Specification. In an example, data aggregator 110 is a computing device. Reference is also made to the associated descriptions for FIGS. 2A and 2B, in which the examples and definitions may also be applied to FIG. 4 to the extent they are relevant.

Expert system 130 includes a processor 410 connected to a memory 420, having stored therein executable instructions for providing an operating system 422 and expert system engine 424. Other components of data aggregator 110 include a storage 450, network interface 480, and peripheral interface 440.

In an example, processor 410 is communicatively coupled to memory 420 via memory bus 470-3, which may be for example a direct memory access (DMA) bus. Processor 410 may be communicatively coupled to other devices via a system bus 470-1.

Processor 410 may be connected to memory 420 in a DMA configuration via memory bus 470-3. To simplify this disclosure, memory 420 is disclosed as a single logical block, but in a physical embodiment may include one or more blocks of any suitable volatile or non-volatile memory technology or technologies.

Storage 450 may be any species of memory 420, or may be a separate device. Storage 450 may be, or may include therein, a database or databases or data stored in other configurations, and may include a stored copy of operational software such as an operating system and a copy of operating system 422 and software portions of expert system engine 424. Many other configurations are also possible, and are intended to be encompassed within the broad scope of this Specification.

Network interface 480 may be provided to communicatively couple data aggregator 110 to a wired or wireless network.

Expert system engine 424, in one example, is a utility or program that carries out methods according to this Specification. Expert system engine 424 may be, in various embodiments, embodied in hardware, software, firmware, or some combination thereof. For example, in some cases, expert system engine 424 may include a special integrated circuit designed to carry out a method, and may also include software instructions operable to instruct a processor to perform the method. It should also be noted that expert system engine 424 is provided by way of non-limiting example only, and that other hardware and software, including interactive or user-mode software, may also be provided in conjunction with, in addition to, or instead of expert system engine 424 to perform methods according to this Specification.

In one example, expert system engine 424 includes executable instructions stored on a non-transitory medium operable to perform method 800 of FIG. 8, or software portions thereof, or a similar method according to this Specification. At an appropriate time, such as upon booting data aggregator 110 or upon a command from the operating system or a user, processor 410 may retrieve a copy of expert system engine 424 (or software portions thereof) from storage 450 and load it into memory 420. Processor 410 may then iteratively execute the instructions of expert system engine 424.

Figure 5:
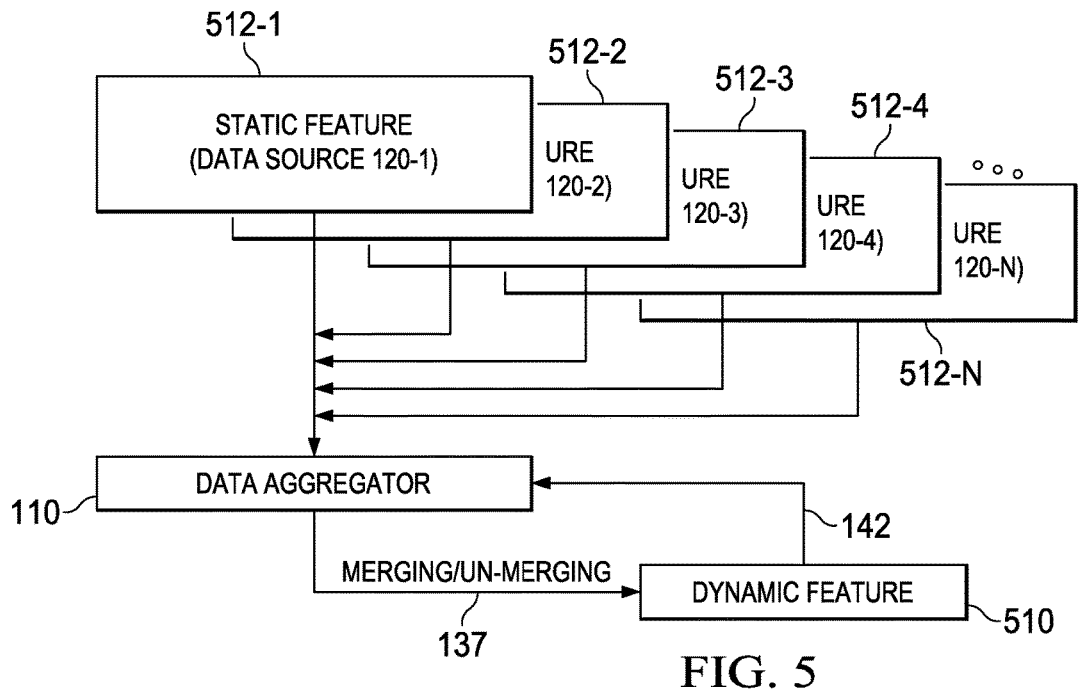
FIG. 5 is a block diagram of feature merging and unmerging according to one or more examples of the present Specification.

FIG. 5 is a block diagram of feature merging according to one or more examples of the present Specification. A plurality of static features 512-1-512-N are shown, each originating in this example from a different data source 120. Static features 512 are provided to data aggregator 110. Data aggregator 110 merges the features as appropriate, via merging/un-merging 137, to provide dynamic feature 510. The act of merging may merely require labeling the features as identical in the features' meta-data storage. Optionally, in addition to the above, a rule may be supplied to convert one feature into another. As a non-limiting example a rule may be expressed as a formula for converting temperature expressed in Celsius into Fahrenheit. After such labeling (and, after optional conversion) by the data aggregator 110 the expert system 130 will treat such features as identical.

Instead of labeling, the features may also be transferred between different data locations (e.g. copied from one database table/row into another). Labeling is a convenient method for un-merging the features—by discarding said labels the features can be quickly and seamlessly unmerged.

After dynamic feature 510 has been used by a controlled system 140 for a sufficient time, feedback 142 is provided to data aggregator 110. Based on feedback 142, data aggregator 110 may maintain merged features, merge new features, or unmerge features.

Figure 6:
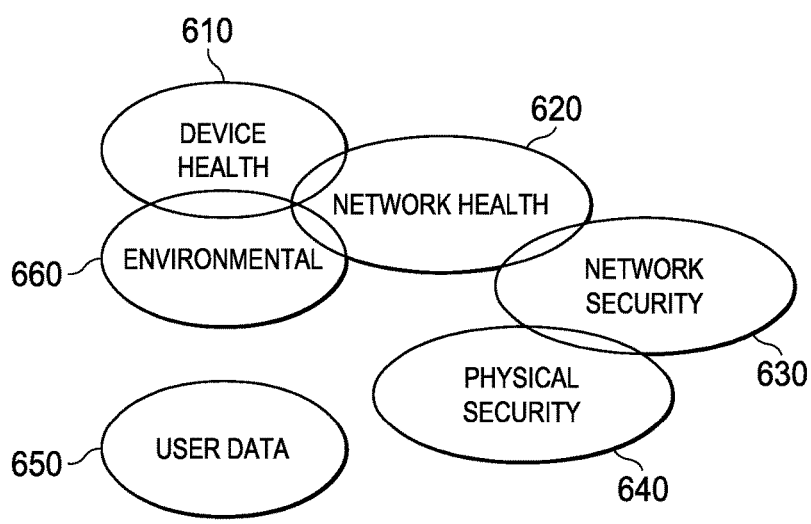
FIG. 6 is a diagrammatic view of feature classes according to one or more examples of the present Specification.

FIG. 6 is a Venn-type diagram of a plurality of upper-level classes in a taxonomy according to one or more examples of the present Specification. As illustrated in this example, six top level classes are provided: device health 610, network health 620, network security 630, physical security 640, user data 650, and environmental data 660. In this example, device health 610, network health 620, and environmental data 660 all mutually overlap to some degree. Network health 620 also overlaps to some degree with network security 630. Network security 630 overlaps to some degree with physical security 640. In this example, user data 650 does not overlap any of the other classes. Also in this example, physical security 640 does not overlap with environmental data 660, network health 620, or device health 610. It should be noted that these classifications, overlaps and non-overlaps are provided by way of example only. In other embodiments, there are cases where other configurations are possible.

Figure 7:
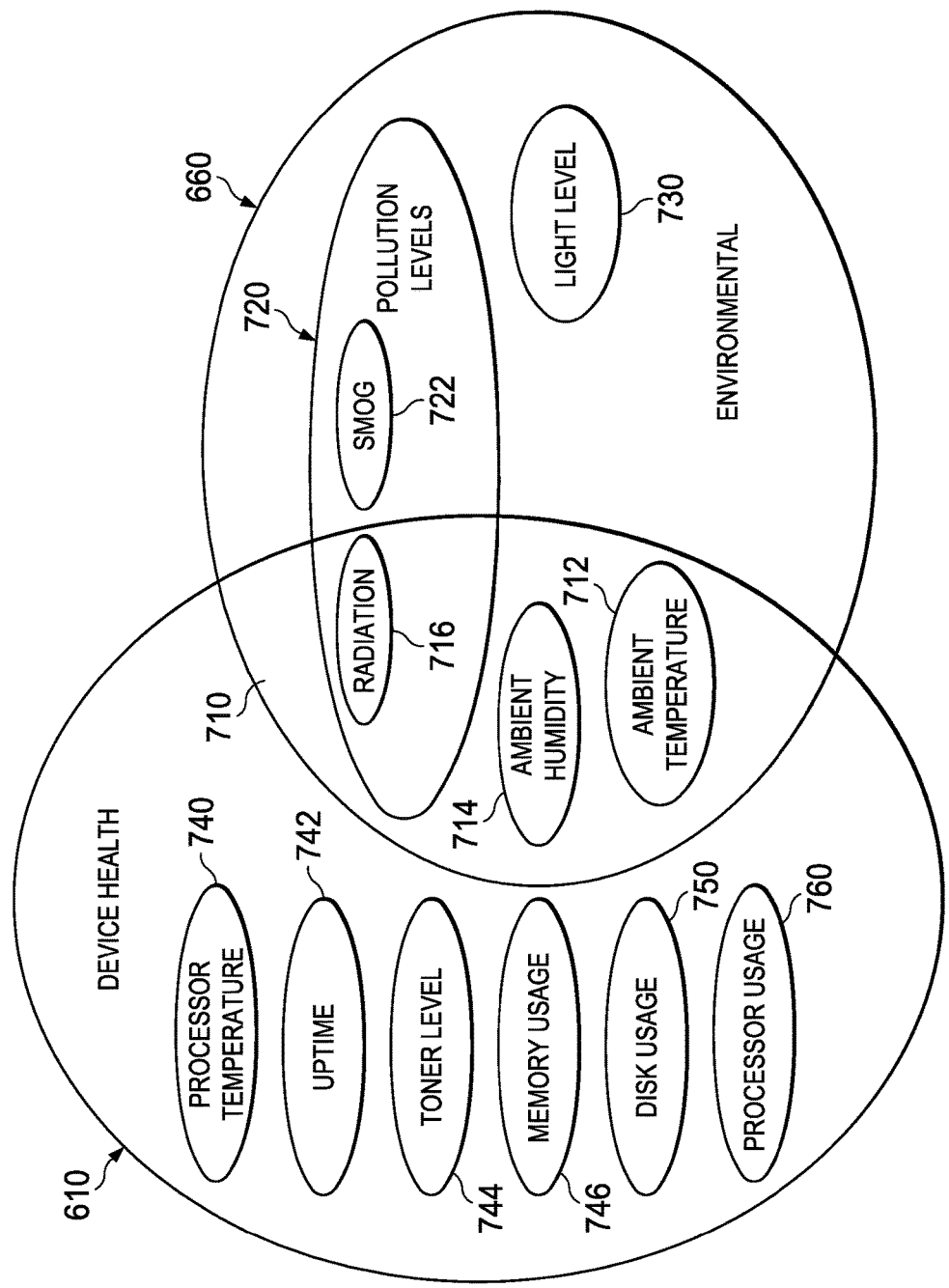
FIG. 7 is a diagrammatic view of feature classes according to one or more examples of the present Specification.

FIG. 7 is a Venn diagram of several classes according to one or more examples of the present Specification. In this case, device health 610 and environmental data 660 are disclosed in more detail for purposes of illustration and discussion. It should be noted, as before, that these classifications are provided by way of example only, and are not intended to be limiting.

In this case, device health 610 and environmental 660 have an overlapping area 710. Overlapping areas 710 includes features such as ambient temperature 712, ambient humidity 714, and radiation 716. These overlap because ambient temperature may be both an environmental factor, and a factor that may have an effect on device health. For example, ambient temperature 712 may affect the operating temperature of processors in a computing system, as well as the comfort of human operators and the operation of other machinery.

It should be noted that a two-way correlation is not necessarily implied, particularly with respect to a particular controlled system 140. For example, while the ambient temperature may have a substantial effect on a processor, a single processor's operating temperature may not have a substantial effect on ambient temperature 712. Thus, ambient temperature 712 is both a device health and an environmental feature, while processor temperature 740 is maintained as strictly a device health feature. An expert system 130 operating a computer cooling system may benefit from receiving ambient temperature 712 as a merged feature 337, while an HVAC controller may not benefit from receiving processor temperature 740.

Similarly, ambient humidity is both a per se environmental feature, and a feature that may affect the performance and device health of a computer. Again, a humidity controller within a computer may thus benefit from a dynamic feature 337 that includes ambient humidity 714.

Finally, radiation 716 is both a per se environmental feature, having a direct and substantial effect on human safety and well-being, while also directly affecting device health 610. In this case, because a properly functioning computer is not itself a substantial source of radiation (especially ionizing radiation), a radiation sensor within a computing device may be usefully merged with an ambient radiation sensor. If either of these sensors detects a substantial increase in radiation, it may be useful to provide an alarm to users operating within the area to warn them of the increasing radiation. This is an example of a feature merge that is bi-directionally effective.

On the other hand, additional environmental features may not be usefully merged with device health features. For example, subclass pollution levels 720 also includes smog 722, which is unlikely to substantially affect a computer. Similarly, ambient light level 730, while extremely important to human operators, is essentially meaningless to a computer.

In the device health class, there are a number of features that are similarly meaningless from an environmental context. These include, by way of non-limiting example, processor temperature 740, computer uptime 742, toner level in an attached printer 744, memory usage 746, disk usage 750, and processor usage 760.

FIG. 8 is a flow diagram of a method 800 according to one or more examples of the present Specification. It should be noted that method 800 may be performed by one or more devices. For example, meta-block 804 may be performed by one or more data sources 120, while meta-block 806 may be performed in various embodiments by a data aggregator 110 working in conjunction with expert system 130.

In meta-block 804, at block 810 data source 120 may send a transmission requesting the current metadata list describing currently supported features. This may be done either via client-server request or in a peer-to-peer fashion from any neighbor. Either way, data source 120 waits for new feature data to be available, for example from feature database 330, and collects the feature data when it becomes available.

In block 820, data source 120 parses out the feature metadata.

In block 822, data source 120 checks whether the feature detected is an existing feature. If it is an existing feature, then transmission may start right away, and in block 842 data sources 120 submits the feature, for example to data aggregator 110. In other examples, data aggregator 110 may work in tandem or in parallel to data sources 120, so that data source 120 submits features directly to expert system 130, while in parallel data aggregator 110 operates to categorize, classify, and otherwise manage the features.

Returning to block 822, if this is not an existing feature, then in block 830 data source 120 may populate the feature metadata with automatic or manual feature entries, and publish the new updated metadata.

In block 840, data source 120 communicates updated metadata, and in block 842, data sourced 120 submits feature data, for example in a data packet, to data aggregator 110.

In meta-block 806, in block 850, discriminator 332 of data aggregator 110 waits for new feature data and receives the new feature data.

In block 852, data aggregator 110 parses out metadata from the data packet that the feature arrived in if the packet includes metadata. Note however, that it may be convenient to provide metadata separately from the data packet. Discriminator 332 then looks at existing metadata tags and determines similarities. It may also, for example, examine the data itself to determine if a merge is appropriate.

In block 854, evaluator 338 may apply merge quality evaluators to existing feature metadata. In block 860, evaluator 338 may determine whether the feature needs unmerging. If it does, then in block 862, unmerger 336 updates the feature metadata and unmerges the feature from dynamic feature 337 (for example performed via removing labels and rules as described above). Control then passes to block 890 where data aggregator 110 stores the feature in feature database 330. If the feature does not need unmerging, then in block 870 merger 334 updates the features "unmerge" metadata, which may be used to unmerge as necessary. Note that blocks 854, 860, 862, and 870 may be performed as a parallel process in certain embodiments. It should also be noted that in certain embodiments, blocks 854, 860, 862, 870 are optional.

In block 872, data aggregator 110 applies feature discriminators to the metadata and feature data, to determine whether a merge is appropriate.

In block 880, if the feature needs merging, then in block 882, merger 334 updates feature's metadata and merge data (for example by labeling identical features by labeling them in the meta-data and, optionally, supplying conversion rules which may be created by the expert system 130 or retrieved from any other source like an associative table created locally or provided on the network or in the Internet or cloud), which may include data about the merger sufficient to perform a future unmerge if necessary.

In block 890, data aggregator 110 stores the data in feature database 330. Returning to block 880, if the feature does not need merging, then control passes back to block 850 to wait for a new feature.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed FIGURES, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

Example Embodiments

There is disclosed in example 1, an apparatus, comprising:
a feature database; and
a discriminator operable to:
receive a new feature; and
classify the new feature according to a feature taxonomy, wherein classifying comprises inspecting a feature metadata, comparing the feature to an existing feature in the feature database, and assigning the feature a class or species based on the comparing.

There is disclosed in example 2, the apparatus of example 1, further comprising a merger operable to merge the new feature with the existing feature to create a combined feature.

There is disclosed in example 3, the apparatus of example 2, further comprising a network interface, and wherein the apparatus is operable to send the combined feature over the network interface.

There is disclosed in example 4, the apparatus of example 3, further comprising an evaluator operable to receive feedback from the network interface, and to consume the combined feature from the merger.

There is disclosed in example 5, the apparatus of example 4, further comprising an unmerger operable to determine that the merging to create the combined feature was not substantially beneficial, and to unmerge the combined feature into the new feature and the existing feature.

There is disclosed in example 6, the apparatus of example 1, further comprising a converter operable to convert the new feature into a form compatible with a value of the existing feature.

There is disclosed in example 7, the apparatus of example 6, wherein converting the new feature comprises converting from one unit system to another unit system.

There is disclosed in example 8, the apparatus of example 1, wherein feature conversion is operable to use the taxonomy for merging the feature with other features.

There is disclosed in example 9, the apparatus of example 1, wherein the feature metadata is in a standards-compliant format.

There is disclosed in example 10, the apparatus of example 9, wherein the format is extensible markup language.

There is disclosed in example 11, the apparatus of example 1, wherein classifying further comprises inferring a classification based on a feature name in the metadata.

There is disclosed in example 12, the apparatus of example 1, wherein classifying further comprises inferring a classification based on a data type name in the metadata.

There is disclosed in example 13, the apparatus of example 12, wherein classifying comprises fuzzy matching.

There is disclosed in example 14, one or more computer-readable mediums having stored thereon executable instructions operable to instruct a processor to:
receive a new feature; and
classify the new feature according to a feature taxonomy, wherein classifying comprises inspecting a feature metadata, comparing the feature to an existing feature in a feature database, and assigning the feature a class or species based on the comparing.

There is disclosed in example 15, the one or more mediums of example 14, further operable to merge the new feature with the existing feature to create a combined feature.

There is disclosed in example 16, the one or more mediums of example 15, further operable to send the combined feature over a network interface.

There is disclosed in example 17, the one or more mediums of example 16, further operable to receive feedback from the network interface, and to determine whether the merging to create the combined feature was substantially beneficial.

There is disclosed in example 18, the one or more mediums of example 17, further operable to determine that the merging to create the combined feature was not substantially beneficial, and to unmerge the combined feature into the new feature and the existing feature.

There is disclosed in example 19, the one or more mediums of example 14, further operable to convert the new feature into a form compatible with the existing feature.

There is disclosed in example 20, the one or more mediums of example 19, wherein converting the new feature comprises converting from one unit system to another unit system.

There is disclosed in example 21, the one or more mediums of example 14, wherein the feature metadata is in a standards-compliant format.

There is disclosed in example 22, the one or more mediums of example 14, wherein classifying further comprises inferring a classification based on a feature name in the metadata.

There is disclosed in example 23, the one or more mediums of example 14, wherein classifying further comprises inferring a classification based on a data type name in the metadata.

A method comprising:
receiving a new feature; and
classify the new feature according to a feature taxonomy, wherein classifying comprises inspecting a feature metadata, comparing the feature to an existing feature in a feature database, and assigning the feature a class or species based on the comparing.

The method of example 24, further comprising:
merging the new feature with the existing feature to create a combined feature;
sending the combined feature over a network interface;
receiving feedback from the network interface, and to determine whether the merging to create the combined feature was substantially beneficial; and
determining that the merging to create the combined feature was not substantially beneficial, and to unmerge the combined feature into the new feature and the existing feature.

What is claimed is:

1. An apparatus, comprising:
a feature database comprising data source features for an expert system to receive environmental inputs and apply them to a system; and
a discriminator operable to:
receive a new data source feature from a network-connected data source comprising an environmental input and a structurally-standardized metadata description of the feature; and
autonomously classify the new feature according to a feature taxonomy, wherein classifying comprises inspecting the feature metadata, comparing the feature to an existing feature in the feature database, and assigning the feature a class or species based on the comparing.

2. The apparatus of claim 1, further comprising a merger operable to merge the new data source feature with the existing feature to create a combined feature.

3. The apparatus of claim 2, further comprising a network interface, and wherein the apparatus is operable to send the combined feature over the network interface.

4. The apparatus of claim 3, further comprising an evaluator operable to receive feedback from the network interface, and to consume the combined feature from the merger.

5. The apparatus of claim 4, further comprising an unmerger operable to determine that the merging to create the combined feature was not substantially beneficial, and to unmerge the combined feature into the new data source feature and the existing feature.

6. The apparatus of claim 1, further comprising a converter operable to convert the new data source feature into a form compatible with a value of the existing feature.

7. The apparatus of claim 6, wherein converting the new data source feature comprises converting from one unit system to another unit system.

8. The apparatus of claim 1, wherein feature conversion is operable to use the feature taxonomy for merging the feature with other features.

9. The apparatus of claim 1, wherein the feature metadata is in a standards-compliant format.

10. The apparatus of claim 9, wherein the standards-compliant format is extensible markup language.

11. The apparatus of claim 1, wherein autonomously classifying further comprises inferring a classification based on a feature name in the feature metadata.

12. The apparatus of claim 1, wherein autonomously classifying further comprises inferring a classification based on a data type name in the feature metadata.

13. The apparatus of claim 12, wherein autonomously classifying comprises fuzzy matching.

14. One or more tangible, non-transitory computer-readable mediums having stored thereon executable instructions operable to instruct a processor to:
receive a new data source feature from a network-connected data source comprising an environmental input and a structurally-standardized metadata description of the feature; and
autonomously classify the new feature according to a feature taxonomy, wherein classifying comprises inspecting the feature metadata, comparing the feature to an existing feature in a feature database comprising data source features for an expert system to receive environmental inputs and apply them to a system, and assigning the feature a class or species based on the comparing.

15. The one or more mediums of claim 14, further operable to merge the new data source feature with the existing feature to create a combined feature.

16. The one or more mediums of claim 15, further operable to send the combined feature over a network interface.

17. The one or more mediums of claim 16, further operable to receive feedback from the network interface, and to determine whether the merging to create the combined feature was substantially beneficial.

18. The one or more mediums of claim 17, further operable to determine that the merging to create the combined feature was not substantially beneficial, and to unmerge the combined feature into the new data source feature and the existing feature.

19. The one or more mediums of claim 14, further operable to convert the new data source feature into a form compatible with the existing feature.

20. The one or more mediums of claim 19, wherein converting the new data source feature comprises converting from one unit system to another unit system.

21. The one or more mediums of claim 14, wherein the feature metadata is in a standards-compliant format.

22. The one or more mediums of claim 14, wherein autonomously classifying further comprises inferring a classification based on a feature name in the feature metadata.

23. The one or more mediums of claim 14, wherein autonomously classifying further comprises inferring a classification based on a data type name in the feature metadata.

24. A method comprising:
   receiving a new data source feature from a network-connected data source comprising an environmental input and a structurally-standardized metadata description of the feature; and
   autonomously classifying the new data source feature according to a feature taxonomy, wherein classifying comprises inspecting the feature metadata, comparing the feature to an existing feature in a feature database comprising data source features for an expert system to receive environmental inputs and apply them to a system, and assigning the feature a class or species based on the comparing.

25. The method of claim 24, further comprising:
   merging the new data source feature with the existing feature to create a combined feature;
   sending the combined feature over a network interface;
   receiving feedback from the network interface to determine whether the merging to create the combined feature was substantially beneficial; and
   determining that the merging to create the combined feature was not substantially beneficial, to unmerge the combined feature into the new data source feature and the existing feature.

* * * * *